US012245716B2

(12) United States Patent
Obliger

(10) Patent No.: US 12,245,716 B2
(45) Date of Patent: Mar. 11, 2025

(54) BEVERAGE EXTRACTION UNIT WITH MOVABLE OUTFLOW OBSTRUCTOR

(71) Applicant: SOCIETE DES PRODUITS NESTLE S.A., Vevey (CH)

(72) Inventor: Nicolas Obliger, Franey (FR)

(73) Assignee: Societe des Produits Nestle S.A., Vevey (CH)

( * ) Notice: Subject to any disclaimer, the term of this patent is extended or adjusted under 35 U.S.C. 154(b) by 962 days.

(21) Appl. No.: 16/980,016

(22) PCT Filed: Mar. 13, 2019

(86) PCT No.: PCT/EP2019/056259
§ 371 (c)(1),
(2) Date: Sep. 11, 2020

(87) PCT Pub. No.: WO2019/175225
PCT Pub. Date: Sep. 19, 2019

(65) Prior Publication Data
US 2020/0405091 A1    Dec. 31, 2020

(30) Foreign Application Priority Data
Mar. 14, 2018  (EP) .................................... 18161841
Dec. 20, 2018  (EP) .................................... 18214451

(51) Int. Cl.
*A47J 31/36*    (2006.01)
*A47J 31/40*    (2006.01)
*A47J 31/46*    (2006.01)

(52) U.S. Cl.
CPC ......... *A47J 31/3633* (2013.01); *A47J 31/407* (2013.01); *A47J 31/461* (2018.08); *A47J 31/468* (2018.08)

(58) Field of Classification Search
CPC .. A47J 31/3604; A47J 31/461; A47J 31/3623; A47J 31/468; A47J 31/407; A47J 31/3633
See application file for complete search history.

(56) References Cited

U.S. PATENT DOCUMENTS 7,350,456 B2 *  4/2008  Blanc .................. A47J 31/3633
                                                        99/295
2011/0297005 A1 * 12/2011  Mariller .............. A47J 31/0673
                                                        99/289 P

FOREIGN PATENT DOCUMENTS

EP          1247480           10/2002
EP          1247480 A1 *      10/2002  .......... A47J 31/0673
JP          2001283317 A      10/2001
RU          2010139872 A       4/2012
(Continued)

OTHER PUBLICATIONS

Russian Office Action for Appl No. 2020133031 dated Jun. 29, 2022.

*Primary Examiner* — Dana Ross
*Assistant Examiner* — Kuangyue Chen
(74) *Attorney, Agent, or Firm* — K&L Gates LLP

(57) ABSTRACT

The invention relates to a beverage extraction unit (1) for extracting a beverage from an exchangeable single-serve portioned capsule (2) containing beverage ingredients and being configured with a flow restricting member for extracting capsules at different beverage pressure and flow conditions. The invention also relates to the beverage machine comprising the extraction unit.

14 Claims, 13 Drawing Sheets

(56) References Cited

FOREIGN PATENT DOCUMENTS

| WO | 2013127476 | 9/2013 |
|----|------------|--------|
| WO | 2015173128 | 11/2015 |

* cited by examiner

BEVERAGE EXTRACTION UNIT WITH MOVABLE OUTFLOW OBSTRUCTOR

CROSS REFERENCE TO RELATED APPLICATIONS

The present application is a National Stage of International Application No. PCT/EP2019/056259, filed on Mar. 13, 2019, which claims priority to European Patent Application No. 18161841.4, filed on Mar. 14, 2018 and European Patent Application No. 18214451.9, filed Dec. 20, 2018, the entire contents of which are being incorporated herein by reference.

FIELD OF THE INVENTION

The invention relates to the field of beverage extraction using an exchangeable portioned capsule in a beverage extraction device. In particular, it relates to an improved extraction unit which can extract beverage ingredients contained in a capsule such as roast-and-ground coffee in particular according to different possible selectable modes of extraction involving high or low beverage flow depending on the selected mode.

BACKGROUND

The preparation of beverage by extraction of an extractible ingredient, such as a brewable ingredient e.g. roast-and-ground coffee and/or tea, contained in a portioned container such as a capsule, a pod or a sachet, is well known.

EP0512468 relates to a capsule with a cup-shaped body and a tearable beverage outlet membrane. The membrane is generally a thin aluminium membrane that tears against a tearing extraction plate of a beverage extracting device such as described in EP0512470.

EP0512470 relates to a system for extracting a coffee using a beverage extraction unit with a tearing extraction plate comprising multiple raised elements and channels in-between (called a "flow grille and relief surface element") which is adapted to receive a sealed capsule, to introduce water under pressure via a water injector into the capsule, to deform the outlet membrane or cover (e.g. an aluminium membrane) and to tear it under the effect of pressure of the liquid rising in the capsule to allow the beverage to be released from the capsule.

EP0602203 relates to a sealed flexible sachet in the form of an individual portion adapted to be extracted under pressure containing at least one powdered substance for the preparation of a beverage such as roast-and-ground coffee; the sachet comprising two identical flexible sheets of circular, oval or polygonal shape, which provide between one another a space for the substance and are sealed over their periphery so that the sachet is substantially symmetrical with respect to its plane of sealing, the sachet being opened under the effect of the increase in pressure in the sachet when the extraction fluid is injected.

EP0870457 relates to an extraction unit similar to as EP0512470, but adapted for a closed impermeable sachet containing coffee substance such as described in EP0602203. The device comprises an upper member comprising means intended to perforate the upper surface of the sachet and permit introduction of water into the sachet, a lower member which has a receptacle for accommodation of the capsule and raised and hollow portions; wherein the extraction surface of the sachet is drawn progressively and locally against the raised and hollow portions; the extraction surface tearing in multiple locations according to a path which is predetermined by the location of the raised and hollow portions and reaching its rupture tension there, in order to permit the flow of the liquid after extraction. The lower portion generally comprises flow apertures to permit the beverage to flow there-through. The raised and hollow portions are preferably under the form of truncated pyramids separated by a network of channels.

Therefore, the beverage extraction systems of the prior art generally utilize an exchangeable capsule, e.g. rigid capsule, sachet or flexible pod, comprising a tearable beverage outlet membrane, e.g. a thin aluminium foil, which can be torn only when a sufficient deformation of this membrane has occurred against the raised elements of the tearing plate. The tearing generally occurs at the edges of the raised elements which are generally multiple small truncated pyramids or rectilinear ridges. The tearing results in the creation of small orifices along the edges of these raised elements. These orifices are relatively small (e.g. 0.1-1.0 mm long and 0.1-0.3 mm wide) and generally the outlet membrane at least partially conforms to the top and upper side of the raised elements so reducing even more the flow opening area. As a result, the pressure drop is relatively high at this interface. Furthermore, filtering of the coffee particle occurs at this confined interface which is an advantage since no additional filter is necessary inside the capsule. This geometry of extraction therefore corresponds to what can be generally called a geometry of an extraction plate with raised elements in the present application. The flow of beverage is then collected in the channels and drained through small openings of well-defined dimensions in the channels.

In the known system of the prior art, the flow rate and pressure are dictated by the intrinsic properties of the capsule and by the performance of the pump.

The backpressure highly depends on the degree of compaction of the ground coffee in the capsule. For a same coffee blend, the variability of pressure can be very high. In particular, for certain coffee blends, in particular, in the low particle size, the pressure may vary from 5 to 15 bar.

SUMMARY OF THE INVENTION

It is a preferred object of the invention to provide a beverage extraction unit that addresses at least some of the problems encountered with prior art units.

It is another preferred object of the invention to provide a beverage extraction unit in which it is possible to modify the beverage flow and/or pressure for the extraction of a capsule without changing the capsule type or the type or performance of the pump.

It is yet another preferred object of the invention to provide a beverage extraction unit in which it is possible to reduce the variability of pressure for the extraction of a given type of capsule.

The invention relates to a beverage extraction unit for extracting a beverage from an exchangeable capsule that contains a beverage ingredient, such as roast-and-ground coffee or tea leaves, and that comprises a liquid entry wall, a beverage outlet membrane and optionally a circumferential flange, such as a flange to and/or at which the membrane is sealed.

The Unit Comprises:
  a frame,
  an injection part for accommodating the liquid entry wall of the capsule and comprising at least a water outlet for injection of water in the capsule, and an extraction part delimiting with the injection part an extraction chamber in which the capsule is housed during extraction, the extraction part and the injection part being relatively movable to open and close the extraction chamber, optionally at said flange of the capsule, the capsule being insertable into and/or removable from the open extraction chamber and the capsule being extractible when housed in the closed extraction chamber.

The extraction part comprises an extraction plate that has a plurality of beverage outlets for allowing the beverage to flow through the extraction plate.

The extraction part further comprises a flow restricting member arranged relative to the extraction plate in a moveable manner between a standard outflow position and a reduced outflow position in which the flow surface area of the beverage outlets is reduced compared to the standard outflow position by obstructing a part of the beverage outlets, the obstructed outlets being partly or entirely closed.

Therefore, the extraction unit of the present invention can be configured to allow a change in the flow and pressure conditions of the beverage extraction so that the extraction result can be better controlled and becomes less dependent on the conditions of flow and pressure dictated by the capsule. The pressure variability is consequently reduced.

The flow may be reduced by a flow restricting surface or surfaces placed proximate at least some of the beverage outlets thereby reducing the flow exiting the beverage outlets. The change of flow and pressure conditions remains relatively simple and inexpensive since the invention can be implemented in existing extraction devices without changing the beverage extraction principle.

The flow restricting member can be moveable relatively to the extraction plate between a standard outflow position in which essentially all beverage outlets are left open and at least one reduced outflow position in which the flow restricting member selectively obstructs a part of the beverage outlets.

The flow restricting member can be maintained immobile relatively to the extraction plate during an entire extraction process of a capsule in the closed extraction chamber. Alternatively, the restricting member can be moved relatively to the extraction plate during the extraction process, for instance the restricting member preventing or substantially inhibiting a beverage outflow from the beverage outlets during an initial pre-wetting phase of the ingredient in the capsule and then the restricting member is moved to a position in which the beverage is allowed to flow through at least some of the beverage outlets of the extraction plate.

Therefore, an advantage that can be obtained is that the pressure conditions can be changed accordingly by a simple relative mobile arrangement at the extraction part. As a result, the pressure can be increased but, at the same time, the variability on the pressure can be reduced by the flow restricting member adopting a reduced outflow position.

The extraction plate may include a plurality of raised elements configured for providing orifices in the outlet membrane. For instance, the orifices are provided in the outlet membrane:
before injection of water into the extraction chamber; and/or are
by pressure rise in the capsule caused by injection of water, e.g. at a capsule inlet pressure in the range of 5 to 20 bar such as 8 to 15 bar, so as to urge the outlet membrane against the plurality of raised elements.

If and when the pressure at the capsule's inlet is in the range of 5 to 20 bar, the pressure at the capsule's outlet membrane may be of course lower, and even lower when the membrane is open.

The extraction part can be devoid of any piercing and/or cutting element for piercing and/or cutting the outlet membrane. For instance, the orifices are preformed in the outlet membrane: prior to housing the capsule in the extraction chamber, e.g. when the capsule is manufactured; and/or by tearing and/or breaking the membrane by pressure rise in the capsule by injection of water, for instance to open pre-weakened parts of the membrane and/or actuate a membrane opening element comprised inside the capsule.

For example, the flow restricting member is arranged to be moveable with respect to an extraction plate which is substantially stationary relative to the frame during extraction so as to reduce the beverage flow through the extraction plate by obstructing a part of the beverage outlets.

The flow restricting member may also be arranged for taking at least two selectable reduced outflow positions in which the flow surface area is reduced at different values, e.g., the flow surface area in a first reduced position is lower than in a second flow reduced position.

The flow restricting member can be arranged to move, between the standard outflow position and the reduced outflow position(s), translationally or rotationally or translationally and rotationally, relative to the extraction plate. For instance, the extraction plate remaining at least substantially stationary relative to the frame during extraction. For example, the flow-restricting member is relatively movable along a linear direction perpendicular to the capsule's outlet membrane when the capsule is housed in the extraction chamber.

The flow restricting member may, for instance, be formed as a plunger with a base plate comprising a flow restricting surface connected to a driving shaft. Such an arrangement can be implemented in the extraction unit without complexity.

The flow restricting member can be arranged for moving in a pivotal movement relative to the extraction plate, for example, about a hinge or pivot point between the flow restricting member and the extraction plate or between the flow restricting member and the extraction part. For instance, the hinge may be positioned in alignment or parallel and offset to the transversal direction of the extraction plate. The hinge or pivot point may also be positioned perpendicularly to the transversal direction of the extraction plate.

The flow restricting member may be arranged for changing the relative position of the flow surface area of the beverage outlets on the extraction plate. For instance, the flow restricting member may be rotationally movable between:
a first standard outflow position and a second standard outflow position, the beverage outlets in the first and second standard positions having substantially the same flow surface area, the obstructed beverage outlets in the first standard outflow position being non-identical to the obstructed beverage outlets in the second outflow standard position; and/or
a first reduced outflow position and a second reduced outflow position, the beverage outlets in the first and second reduced outflow positions having the same or a different flow surface area, the obstructed beverage outlets in the first reduced outflow position being non-identical to the obstructed beverage outlets in the second reduced outflow position.

It should be noted that the arrangement of the flow restricting member for moving relative to the extraction plate may take many variations which can be chosen depending on the arrangement of the extraction device such as the available space and the horizontal, vertical or inclined orientation of the extraction device. For example, the extraction device takes a horizontal orientation of the injection and extraction parts enabling an insertion of the container between the parts by the effect of gravity such as described in EP1859713B1, EP2205133B1 or EP2608705B1. The extraction device can also be inclined such as described in WO 2017/001644.

The extraction plate can be arranged to move in translation relative to the flow restricting member which remains at least substantially stationary relative to the frame during extraction.

In a mode, the flow restricting member comprises at least one continuous flow restricting surface arranged for obstructing more than one beverage outlet at once in the reduced outflow position. The flow restricting surface may for instance take the form of a full or partial disc.

In another mode, the flow restricting member comprises a plurality of discrete flow restricting elements; each of the flow restricting elements being arranged for individually obstructing a beverage outlet. The advantage is to ensure a more efficient obstruction of the beverage outlets and to reduce the risk of leakage when full closure of the beverage outlet is desired.

The flow restricting member may include a plurality of discrete flow restricting elements formed as raised elements extending from a base plate of e.g. from the above plunger. The raised elements may be shaped to individually engage in complementary shaped recessed portions of the extraction plate in which are lodged beverage outlets. Such arrangement may offer an increased resistance against fluid pressure and leakage.

For improving extraction consistency, the flow restricting surface or discrete flow restricting elements may be pressure-responsive. For instance, the restricting surface of the discrete flow restricting elements are resiliently mounted, e.g. with a spring, and/or resiliently deformed when deformed when compressed against the extraction plate during obstruction. For example, the flow restricting surface or discrete flow restricting elements may include or may be made of rubber (e.g. silicone rubber EPDM) or thermoplastic elastomer (s) or soft elastic plastic.

The raised elements may have variable compressible lengths and/or are resiliently mounted with variable resilience. Variable lengths or resilience enable(s) to vary the number of obstructed beverage outlets depending on the level of compression of the elements against the extraction plate. To obstruct fewer beverage outlets, only longer or harder-mounted elements are compressed and shorter or softer-mounted elements remain uncompressed or distant from the outlets. To obstruct more beverage outlets, both longer/harder-mounted and shorter/softer-mounted elements are compressed but the longer/harder-mounted elements are obviously more compressed than the shorter/softer-mounted elements. As a result, different outflow positions can be obtained by varying the position of the flow restricting member relative to the extraction plate.

The extraction device may further comprise at least one drive member, e.g. a piston, connected to the flow restricting member and the extraction plate so as to reduce or increase the flow surface area of the extraction plate.

The drive member may be driven by any suitable driving arrangement working on a mechanical and/or electrical and/or hydraulic principle. The drive member can be driven by a solenoid actuator, a hydraulic actuator or an electric motor, e.g. a stepper motor. The drive member may be connected to the flow restricting member via a transmission, e.g. a gear transmission and/or a cam transmission and/or a lever transmission.

The drive member may operate the flow restricting member independently from the pressure in the extraction chamber, e.g. to achieve a desired flow such as a constant flow.

The drive member may operate the flow restricting member independently from the flow of beverage out of the extraction chamber, e.g. to achieve a desired pressure in the extraction chamber such as a constant pressure or a pressure profile.

The drive member may operate the flow restricting member to achieve at the same time a pressure in the extraction chamber in a desirable pressure range and a flow of beverage out of the extraction chamber in a desired flow range.

The drive member can be arranged with control means, e.g. electric and/or communication connection means, for being controlled by a control unit of the beverage machine or by a remote control device (e.g. a mobile computer).

Another aspect of the invention relates to a beverage machine including a beverage extraction unit as described above. The machine includes: a pump for supplying water to the extraction unit; a control unit configured for controlling a relative movement of the flow restricting member, e.g. via a or said drive member, between the standard outflow position and the reduced outflow position; and optionally a thermal conditioner, such as a heater and/or a cooler e.g. a flow heater and/or a flow cooler, for thermally conditioning water supplied by the pump to the extraction unit.

The control unit may be configured to maintain the flow restricting member and the extraction plate relatively stationary during an entire extraction of beverage from a capsule in the extraction chamber.

The control unit may be configured to vary the relative positions of the flow restricting member and the extraction plate during an extraction of beverage from a capsule in the extraction chamber.

The machine being can be configured to maintain the flow restricting member and the extraction plate relatively stationary during an entire extraction of beverage from a capsule of a first type and to vary the relative positions of the flow restricting member and the extraction plate during an extraction of beverage from a capsule of a second type.

A further aspect of the invention relates to a use of a capsule for such a beverage machine.

The pressure is typically measured downstream a pump and upstream the water inlet, e.g. in the fluid line between the water inlet and the pump. The pressure in the extraction chamber or in the capsule may possibly be reduced compared to such measured pressure by the presence of a check valve, e.g. at the water inlet of the injection part, and/or restrictions provided in the water inlet of the injection part or by piercing members engaged in the entry wall of the capsule and/or by the ingredient in the capsule and/or other obstacles.

DETAILED DESCRIPTION OF PREFERRED EXAMPLES

Figure 1:
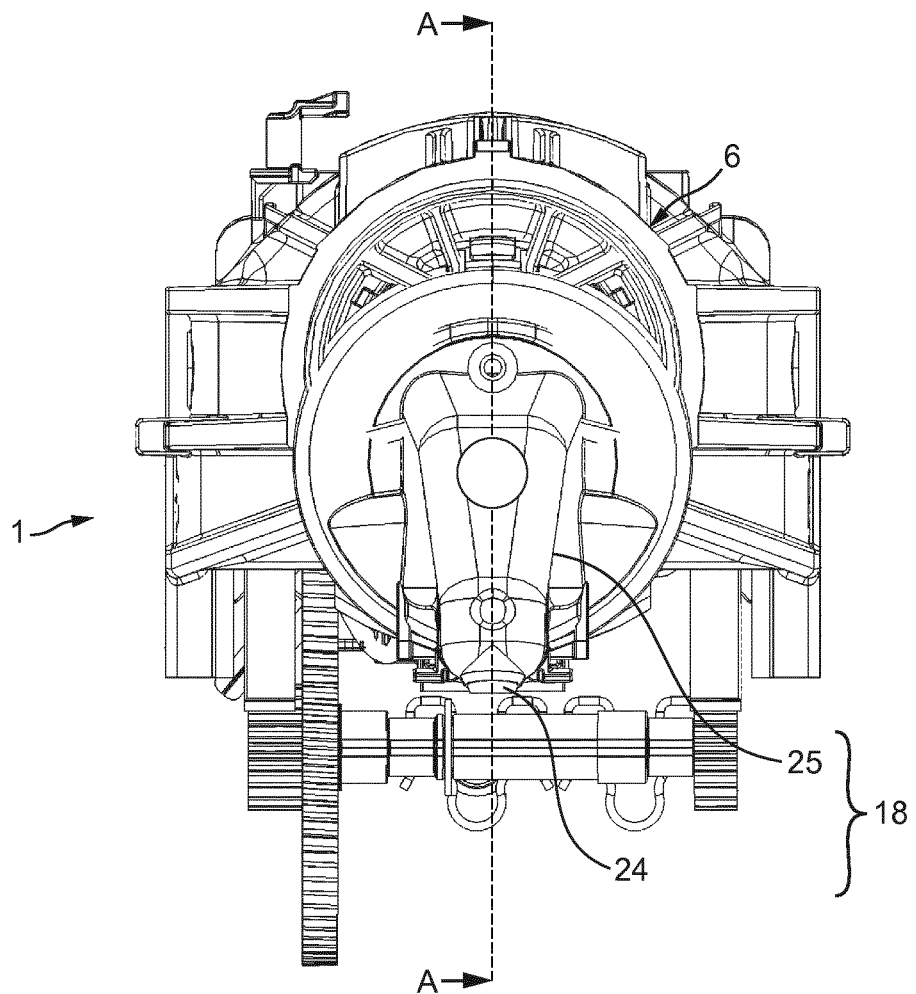
FIG. 1 is a front planar view of the extraction unit according to an embodiment of the invention.
Figure 2:
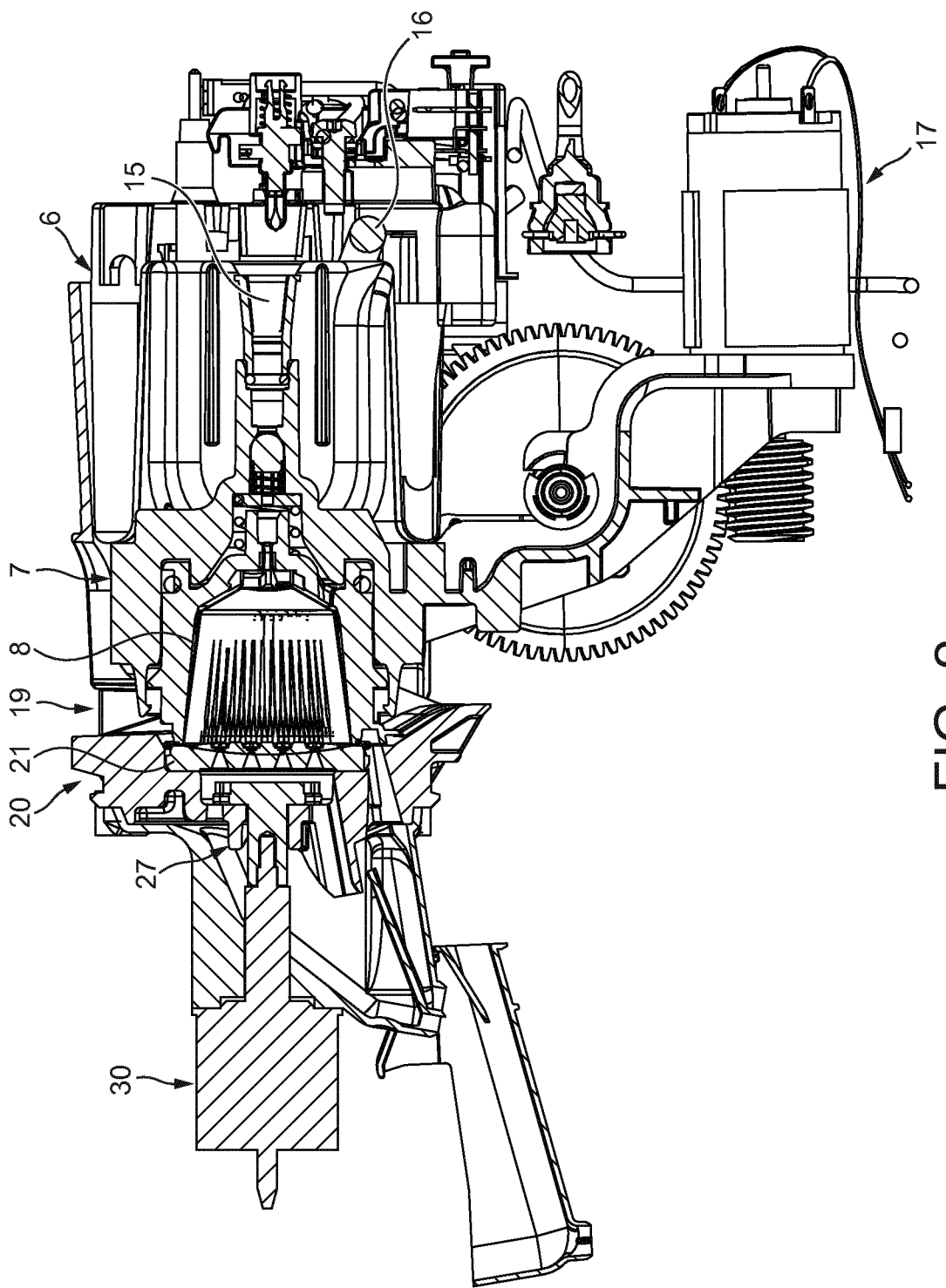
FIG. 2 is a cross-sectional view along plane A-A of FIG. 1 of the extraction unit shown therein, the extraction unit being in a closed position with a capsule.
Figure 3:
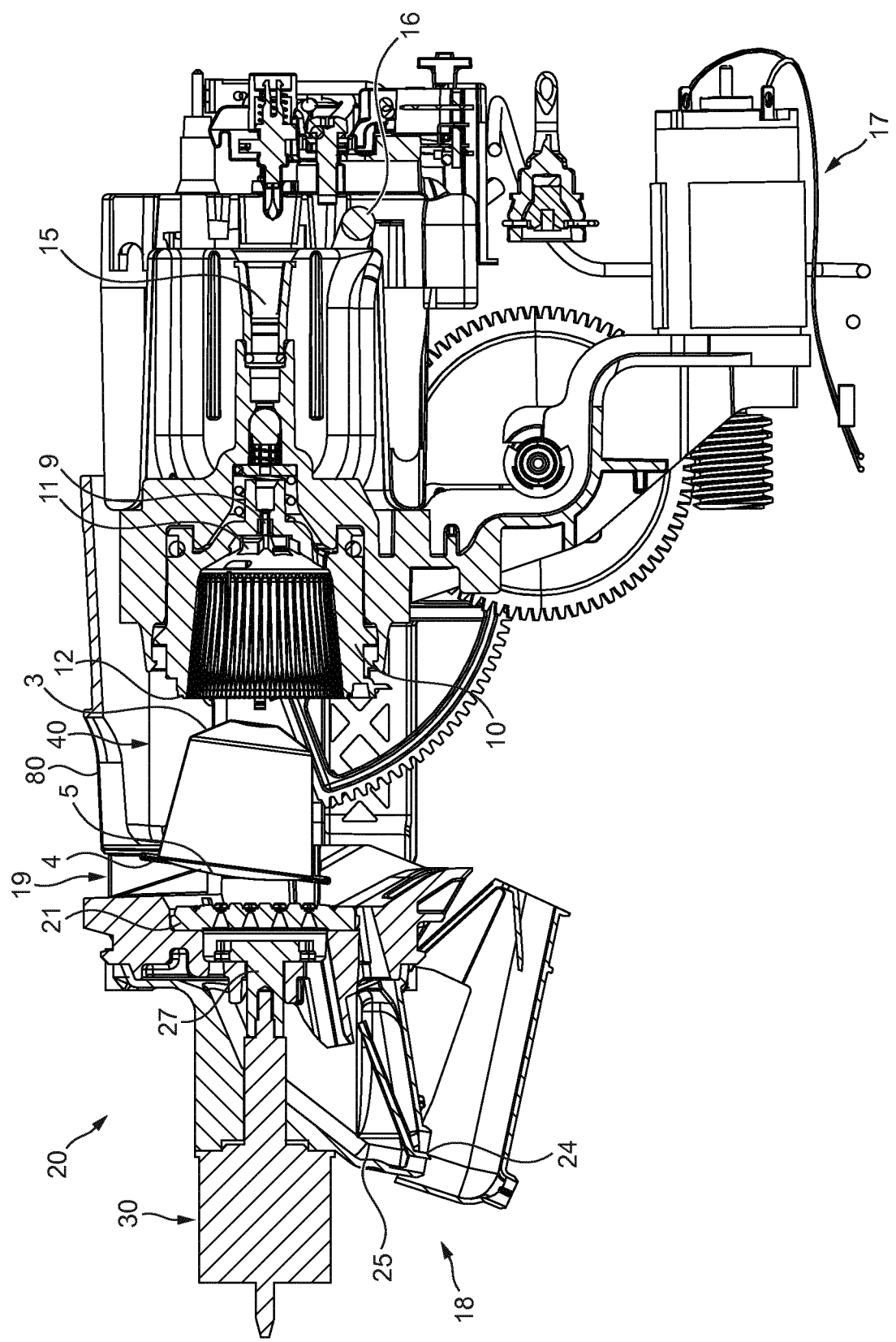
FIG. 3 is a cross-sectional view along plane A-A of FIG. 1 of the extraction unit shown therein, the extraction unit being in an open position with a capsule.

Exemplary extraction unit 1 according to the present invention is described in general manner in relation to FIGS. 1 to 3. Unit 1 is arranged for receiving an exchangeable capsule 2 containing portioned ingredients such as roast-and-ground coffee.

In the present example, capsule 2 is a beverage ingredient capsule with a relatively rigid cup closed by a flexible outlet membrane. In possible variants, the extraction unit could also be configured to receive a capsule formed as a flexible pod or sachet. A pod would generally be formed of flexible walls. An example of exchangeable capsule 2 comprises a liquid entry wall 3, circumferential flange 4 and a beverage outlet membrane 5. The capsule may contain a dose of roast-and-ground coffee. Beverage outlet membrane 5 is not permeable to liquid and must be perforated, cut and/or torn to let beverage extract pass through it. The beverage outlet membrane may be made of aluminium or a laminate of paper-polymer, paper-aluminium or aluminium-polymer-paper. A beverage capsule can comprise a cup-shaped body forming the liquid entry wall 3 and flange 4 onto which the beverage outlet membrane 5 is welded. For example, the outlet membrane may be 30 to 50 µm thick, preferably about 40 µm thick (The thickness is determined here without considering a possible embossing pattern). A pod may comprise two flexible walls sealed at a flange. The pod may be symmetrical along the plane of the flange thereby providing the possibility to extract the beverage from any one of the two walls. Therefore, one wall forms the entry wall and the other wall forms the beverage outlet membrane depending on the orientation of the pod in the beverage extraction unit.

The extraction unit comprises a frame 6, an injection part 7 and an extraction part 20.

As illustrated in FIGS. 2 and 3, injection part 7 is arranged for accommodating the liquid entry wall 3 of the capsule and for supplying water in an extraction chamber 8 when the beverage extraction unit is closed. Injection part 7 comprises at least one water outlet 9 for injection of water. The injection part generally may include a cage 10 forming a cavity for receiving the liquid entry wall and may incorporate perforating members 11 for perforating the liquid entry wall 3 of capsule 2. Perforating members 11 may be blades or needles projecting from the bottom of the cavity of the cage 10. At the front end of cage 10 can be provided a circumferential pressing edge 12 for closing the extraction chamber 8 onto the flange 4 of the capsule and pressing the flange against the extraction part 20. Extraction chamber 8 can be delimited by the cavity of the cage 10 of injection part 7 up to pressing edge 12. Extraction unit 1 typically includes a water line 15 for supplying water to the water outlet 9. A water heater 16 may be provided to the extraction unit to heat water to a suitable temperature for extracting the beverage ingredient of capsule 2. Injection part 7 of unit 1 may be provided with a cavity adapted for capsules having a flange of the a given diameter. The flange diameter generally determines the compatibility of the capsule which is pressed by the injection part against the extraction part. However, the injection part can also be arranged in an expandable manner to adapt the extraction chamber to capsules of different diameters and/or lengths such as described in EP2906092, EP2906093 or EP2908706.

In this embodiment, injection part 7 can be mounted in a static or slightly movable manner relative to frame 6, extraction part 20 being mounted in a movable manner so as to move between an open position (FIG. 3) and a closed position (FIG. 2) in which the extraction chamber 8 is formed. Extraction part 20 may be laterally guided in frame 6 such as by guiding rails 75 and the like. Extraction part 20 may be driven between the open and the closed positions by a motorized or manual driving assembly 17. In a possible variant, the injection part 7 can be mounted in a movable manner relative to frame 6 and the extraction part 20 can be made mounted stationary relative to the frame.

In the open position, injection part 7 is distant from extraction part 20 to allow capsule 2 to be inserted in the extraction unit in an insertion passage 40 (FIG. 3). For this, extraction part 20 may include or be associated with a slider 19 (e.g. two lateral sliding grooves). As apparent in FIG. 4, the extraction part may comprise or be associated with an opening 80 having a shape corresponding to the capsule for allowing capsule 2 to be inserted into slider 19 and pass along passage 40. The extraction part may further comprise or be associated with stop means 81, e.g. such as stope means positioned in or at slider 19, for stopping the capsule in passage 40 when extraction unit 1 is in the open position as illustrated in FIG. 3 thereby allowing the extraction part and the injection part to be relatively moved together and house the capsule when they are in the closed position (FIG. 2). Other capsule handling arrangements can also be used. Nearly any capsule loading and unloading arrangement can be used to implement the invention.

Figure 20:
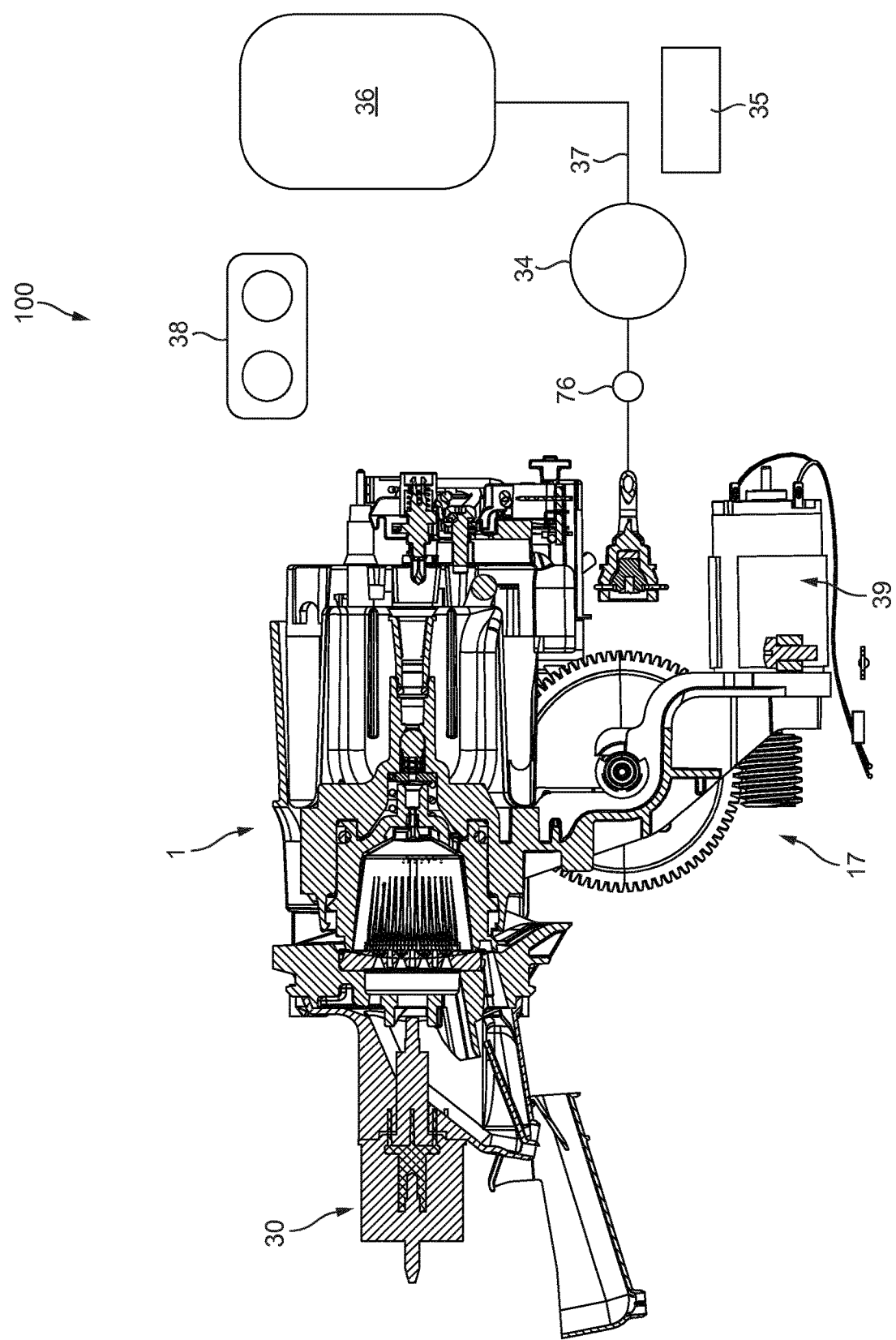
FIG. 20 illustrates, partly schematically, a beverage machine including the extraction unit shown in FIG. 1.

Extraction part 20 includes an extraction plate 21 which is configured for interfacing with the beverage outlet membrane of the capsule in the closed position of the extraction unit. The extraction plate can be arranged in such a manner that the outlet membrane is in contact with the extraction plate when the capsule is in place with the extraction unit in closed position of the injection part and extraction part (FIGS. 2 and 20). The extraction part has beverage outlets 22 for draining the liquid beverage extract flowing out of the capsule during extraction. The beverage outlets 22 may be provided through the extraction plate 21.

Figure 14:
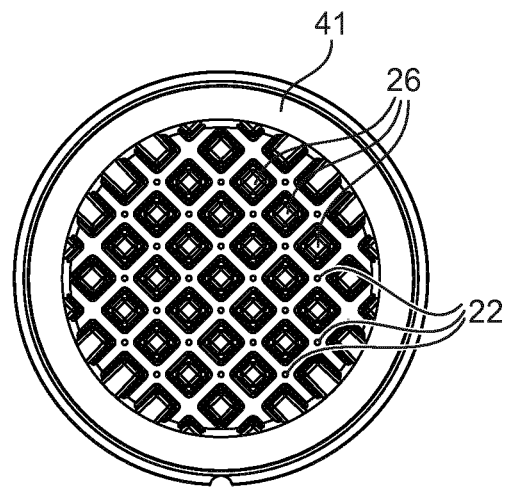
FIG. 14 is a front view of the extraction plate of FIG. 13.

As shown in FIG. 14, the number of beverage outlets 22 and their dimensions may vary. In a preferred mode, the number of outlets is about of 10 to 30, such as 15 or 20 to 25 e.g. 24, and their diameter is in the range of about 0.1 to 1 mm, such as 0.3 to 0.8 mm, e.g. 0.4 to 0.6 mm. The diameter is sufficiently small so that the outlets, possibly in collaboration with the capsule's open or opened membrane 5, filter coffee particles to at least substantially prevent such particles from passing from chamber 8 through extraction plate 21.

As illustrated in FIGS. 3 and 20, extraction part 20 may be associated with a beverage directing guide 18 downstream of extraction plate 21 to direct the beverage extract from beverage outlets 22, for example via a collector 25 with an outlet 24 of extraction part 20. The directing guide may be used to dispense beverage to a beverage recipient (FIG. 20), such as to a cup or a mug, and to collected waste (FIG. 3), e.g. in a waste collector associated with extraction unit 1, e.g. inside machine 100. Directing guide 18 may comprise at one end a dispensing outlet for directing the beverage extract to the recipient, as illustrated in FIG. 20, and at an opposite end a draining edge for guiding residues from outlets 22 to a waste collector, as illustrated in FIG. 3. Directing guide 18 may be pivotable between a beverage dispensing position in which liquid received in guide 18 is passed to the guide's dispensing outlet and a residue collection position in which liquid received in guide 18 is passed over the guide's draining edge (FIGS. 3 and 20). Directing guide 18 and/or, when present, collector 25 may comprise additional features such as a steam extractor, flow divider(s), additional collector, distributor and/or foam breaker(s).

Extraction plate 21 may include a plurality of raised or relief elements 26 which are configured for opening the capsule's outlet membrane 5 by forming orifices therein. For instance, the number and shape of the raised elements are determined for perforating, e.g. tearing and/or cutting, the outlet membrane of the capsule. Orifices 91 can be provided by elements 26 in the outlet membrane: before injection of water into extraction chamber 8, e.g. when the extraction part 20 and the injection part 7 are relatively moved together; and/or by pressure rise in the capsule caused by injection of water, e.g. at a capsule injection pressure in the range of 5 to 20 bar such as 8 to 15 bar, so as to urge the outlet membrane against the plurality of raised elements 26.

The pressure also highly depends on the perforation resistance of the outlet membrane and so on the material(s) and the thickness of the outlet membrane.

The extraction part can be devoid of any piercing and/or cutting element for piercing and/or cutting the outlet membrane. optionally the orifices being preformed in the outlet membrane: prior to housing the capsule in the extraction chamber, e.g. when the capsule is manufactured; and/or being formed by tearing and/or breaking the membrane by pressure rise in the capsule by injection of water, for instance to open pre-weakened parts of the membrane and/or actuate a membrane opening element comprised inside the capsule.

The extraction plate may have a peripheral support portion 41 without raised elements 26 for supporting, when present, the flange of the capsule in place in the unit. The extraction plate is typically generally disc-shaped, possibly fitted with projecting assembly parts. The extraction plate can be a transversally rigid part, i.e. without axially moving peripheral part and/or moving central part. For example, the extraction plate is made of a substantially monolithic part.

The extraction part 20 comprises a flow restricting member 27 which is moveably arranged relative to the extraction plate 21. Hence, restricting member 27 or the extraction plate or both are movable relative to frame 6 when restricting member 27 is moved relative to extraction plate 21.

The flow restricting member can be used to reduce the flow surface area formed by the plurality of beverage outlets 22 of the extraction plate by obstructing a number of beverage outlets for reducing the beverage flow area through the extraction plate. The flow can be reduced by partly closing certain or all beverage outlets and leaving others fully opened. The flow can be reduced by fully closing certain beverage outlets and partly closing other beverage outlets and/or leaving other beverage outlets unobstructed.

When beverage outlets are obstructed by the action of the flow restricting member, a resulting backpressure is formed upstream the extraction plate.

Figure 4:
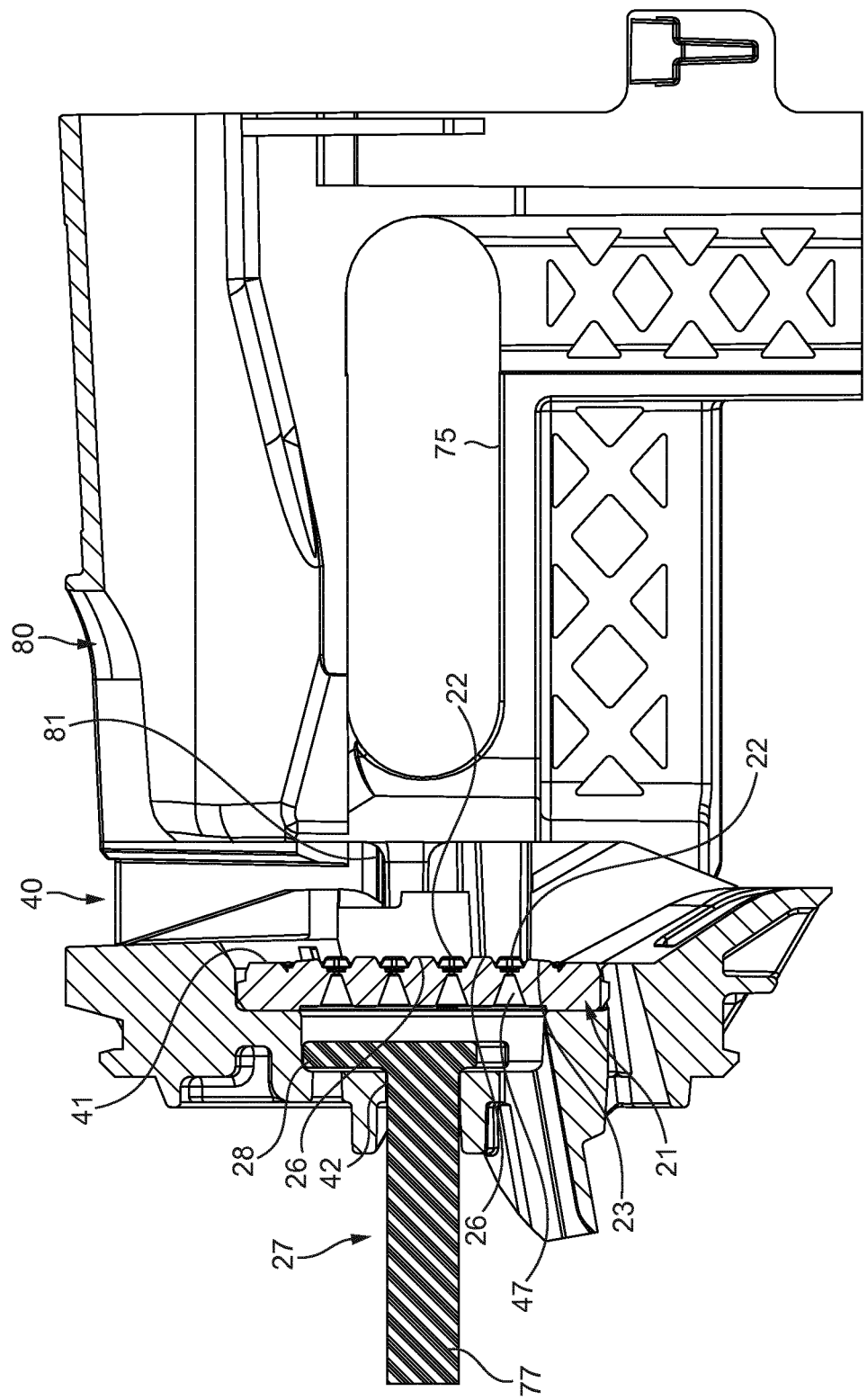
FIG. 4 is an enlarged view of part of the extraction unit as illustrated in FIG. 3 (the injection part and the capsules being notably omitted), the flow restricting member being in a standard outflow position.

Considering FIGS. 3 and 4, the flow restricting member 27 may be moved between a flow reducing position and a free or standard position by a drive member 30. The drive member may be arranged to move the restricting member relative to the extraction plate e.g. in a translational direction between the two positions. For this, shaft 77 of restricting member 27 can be guided in translation along a guiding opening 42 of the extraction part, e.g. a front part of it. Drive member 30 may be driven by a solenoid actuator, a hydraulic actuator and/or an electric motor, e.g. a stepper electrical motor, which can be connected to a shaft 77 of the base plate 28 of the restricting member or be connected directly to the base plate. For example, a hydraulic piston could be actuated by the water pump of the beverage machine via a fluidic line which is independent from the water injection to the injection part.

In the free or standard position illustrated in FIG. 4, restricting member 27 is moved away from the extraction plate and all beverage outlets 22 are left open. A distance of several millimeters can be maintained between outlets 22 and restricting member 27 to prevent a reduction of the flow surface area of beverage outlets 22.

Figure 5:
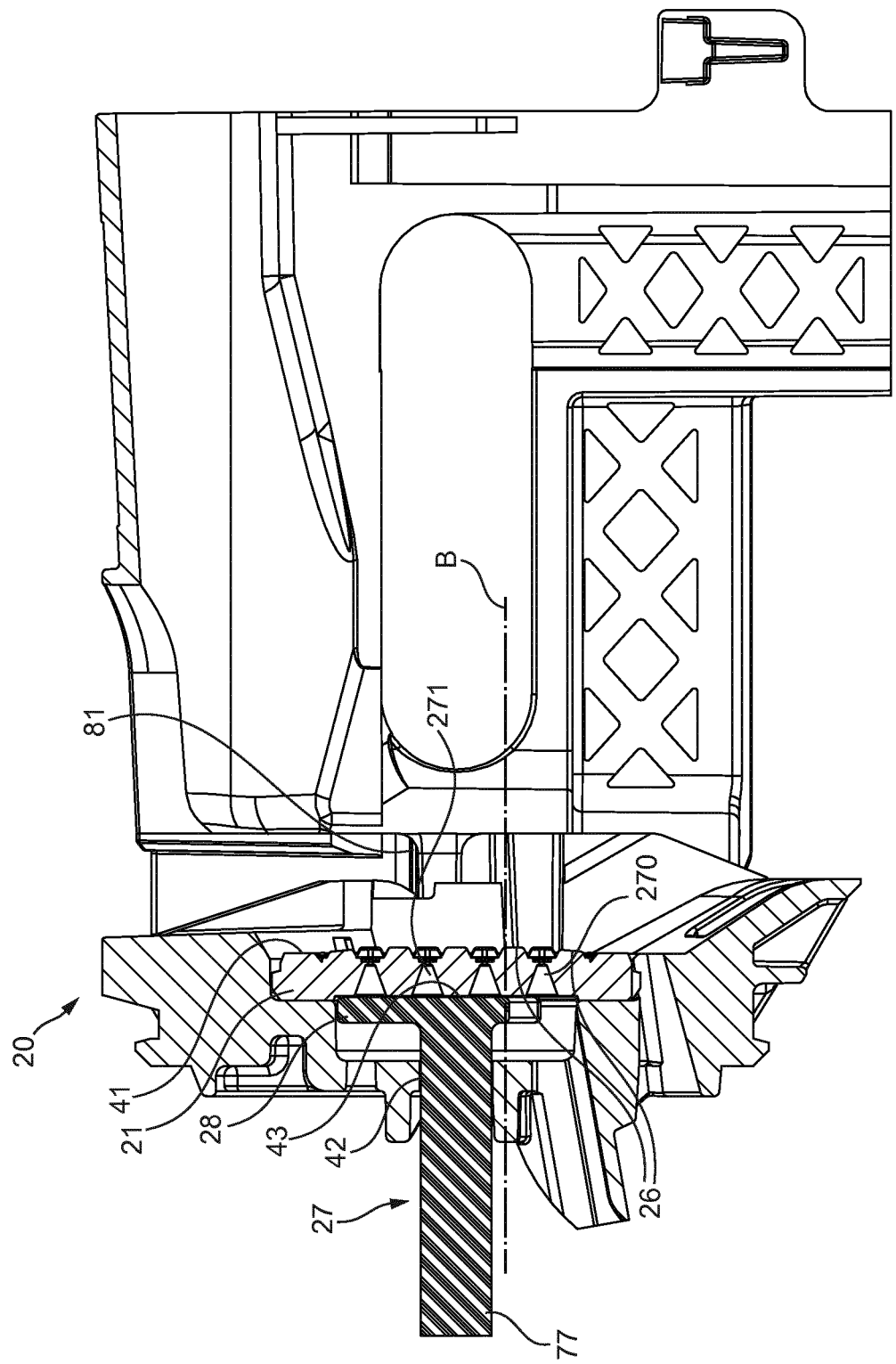
FIG. 5 is an enlarged view of part of the extraction unit as illustrated in FIG. 3 (the injection part and the capsules being notably omitted), the flow restricting member being in a reduced outflow position.
Figure 6:
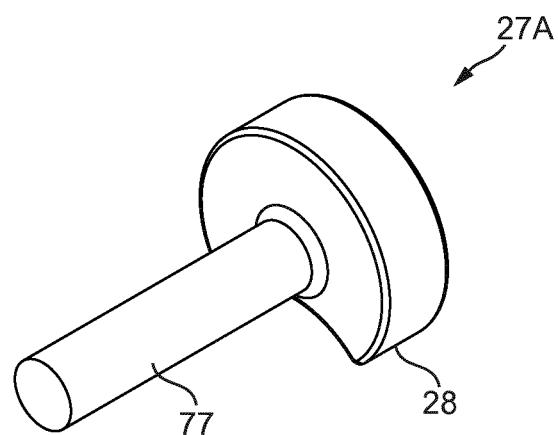
FIGS. 6 to 9 are different perspective views of a first example of a flow restricting member with a continuous flow restricting surface.
Figure 7:
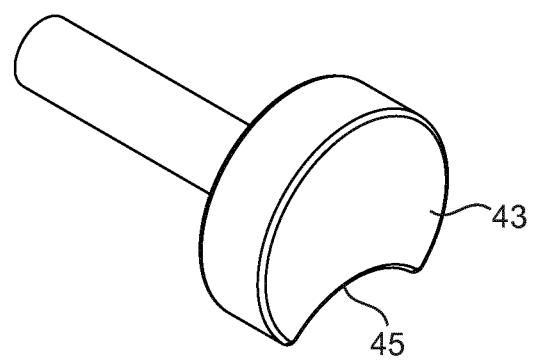

In the flow reducing position illustrated in FIG. 5, flow restricting member 27 is engaged in contact with extraction plate 21 for reducing the beverage flow through extraction plate 21. The position can be obtained by operating driving member 30 to move restricting member 27 against extraction plate 21 until a close contact is established. Restricting member 27 can have a flow restricting surface 43 applying a closing force on the rear of the extraction plate sufficient to resist the pressure of fluid during extraction and to maintain the beverage outlets obstructed.

Figure 12:
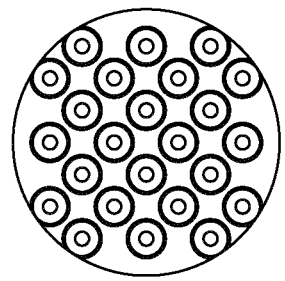
Figure 13:
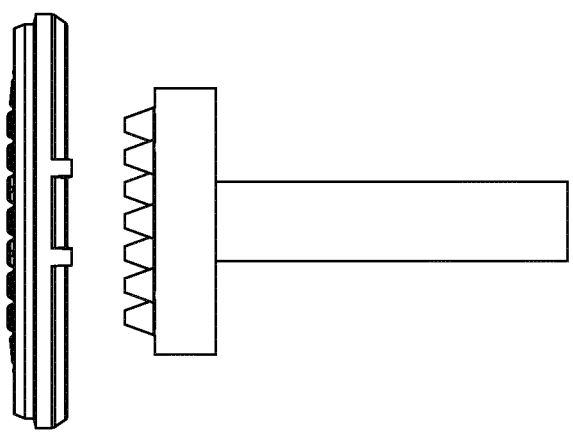
FIG. 13 is a side view of the combination of the flow restricting member of FIGS. 10 to 12 and extraction plate in a standard flow position.

FIGS. 6 to 9 represent a flow restricting member 27A with a continuous restricting surface 43 which is smaller than the surface of coverage of the beverage outlets in the extraction plate. Base plate 28 of the restricting member can have the shape of a partial disc delimiting a cut-out 45. The flow restricting surface 43 may obstruct a determined number of beverage outlets whereas the cut-out is delimited to leave one or several unrestricted beverage outlets 270 opened as show in FIGS. 5 and 12. Therefore, during extraction, the flow of beverage is forced to leave through the unrestricted beverage outlet(s) 270. For instance, the restricting member can be designed to obstruct a majority of the beverage outlets, e.g. ⅔ or more of the total number of outlets, e.g. 18 or 20 out of 24 outlets.

Flow restricting member 27A may be rotationally movable between:
- a first standard outflow position and a second standard outflow position, the beverage outlets in the first and second standard outflow positions having the same or at least substantially the same flow surface area, the obstructed beverage outlets in the first standard outflow position being non-identical to the obstructed beverage outlets in the second outflow standard position; and/or
- a first reduced outflow position and a second reduced outflow position, the beverage outlets in the first and second reduced outflow positions having the same or a different flow surface area, the obstructed beverage outlets in the first reduced outflow position being non-identical to the obstructed beverage outlets in the second reduced outflow position.

Figure 21:
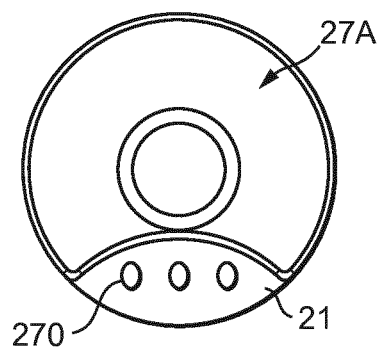
FIGS. 21 to 23 illustrate a fourth example of a flow restricting member operating in rotation.
Figure 22:
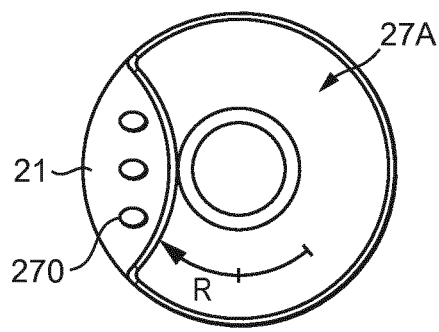
Figure 23:
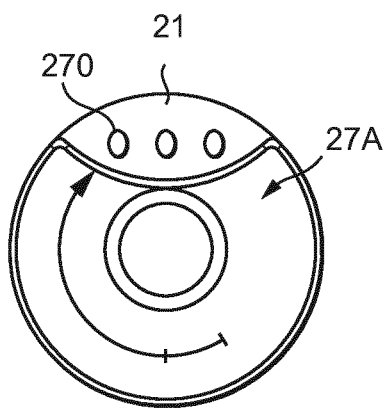
Figure 24:
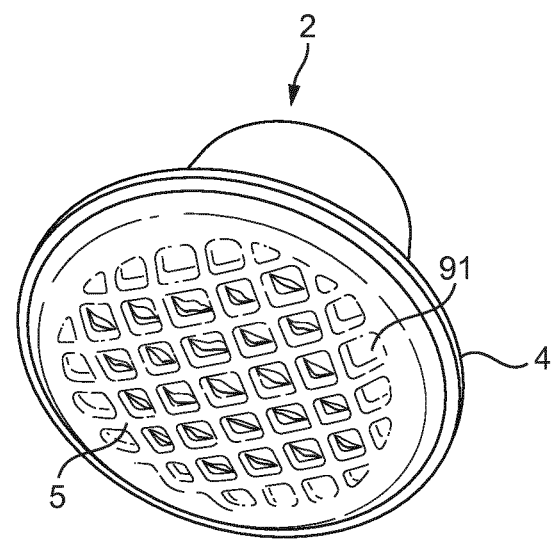
FIG. 24 shows an exchangeable capsule with a plurality of orifices after extraction in the beverage machine of FIG. 20.

As illustrated in FIGS. 21 to 23, the flow restricting member 27A may be moved in rotational direction R so as to displace the angular position of cut-out 45 relative to the extraction plate and accordingly move the position of unrestricted outlets 270 through which the beverage can flow. The position of the cut-out 45 may be moved from an angle comprised, for example, between 0 and 180 degrees. In FIG. 21, the position of the flow restriction member is by reference viewed at 0 degree. At such position, the cut-out is in the lowest position and the open outlets 270 in the extraction plate are positioned in the lower half of the extraction plate. In FIG. 22, the flow restriction member has been rotated by 90 degrees in clockwise direction relative to the position of reference. The cut-out is in the median position and the open beverage outlets 270 are distributed equally below and above the median line of the extraction plate. In FIG. 23, the flow restriction member has been rotated by 180 degrees in clockwise direction relative to the position of reference and the cut-out is the highest position with the open outlets 270 being positioned in the upper half of the extraction plate. Therefore, the position of flow surface areas of the beverage outlets can be varied while maintaining the value of the area relatively constant. The change of the position of the flow surface area relative to the extraction plate may be important to vary the extraction conditions such as the coffee extraction yield, the quality of crema or other parameters. In particular, a lower opening surface position such as the one in FIG. 21 may be advantageous for improving the coffee crema and/or decreasing the extraction yield compared to a higher position (FIG. 22 or 23).

Obviously, the flow restriction member 27A may be moved at any possible angular value ranging from 0 to 360 degrees. The rotation may also possibly be controlled in opposite direction to direction R. The surface of the cut-out may also be varied in order to increase the number of open outlets or, on the contrary, decrease the number of outlets. For instance, the base plate may include a first portion of a disc and a second portion of the disc that delimits the cut-out. It should also be noticed that the flow restriction member 27A could remain stationary (relative to the frame) and the extraction plate 21 could be moved in rotation relative to the flow restriction member 27A. In another alternative, the two elements 27A, 21 could be both moved in rotation relative to each other and to the frame.

In a mode in which the extraction plate is oriented upright as illustrated in FIG. 5, the restricting member 27 can be arranged for obstructing the upper beverage outlets 271 and leaving the lower beverage outlets 270 unobstructed. The upper beverage outlets 271 are typically the ones positioned above a horizontal plane B crossing the extraction plate. The horizontal plane may be situated between the ¼ and the ¾, more preferably between the ⅓ and ⅔, of the vertical height of the extraction plate. The advantage is that the preferential water paths which naturally occur through the coffee bed in the upper part of the capsule (when such is positioned horizontally in the unit) can be successfully prevented and a more efficient coffee extraction can be obtained.

Figure 15:
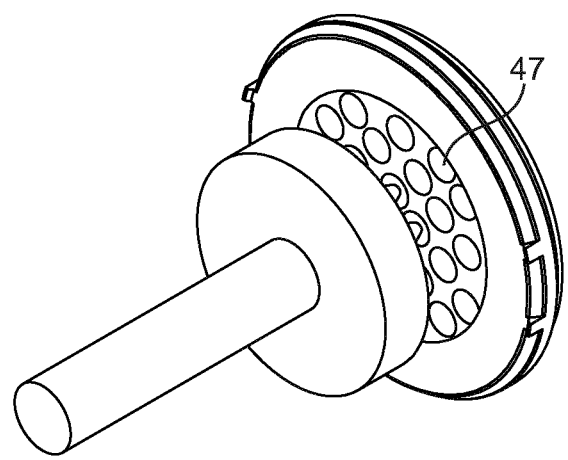
FIG. 15 is a perspective view of the combination of the flow restricting member of FIGS. 10 to 12 and extraction plate in standard flow position.
Figure 16:
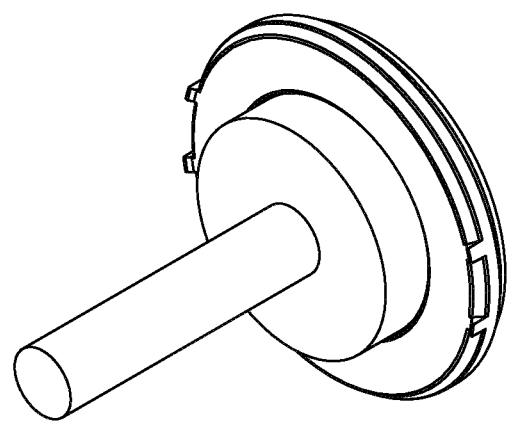
FIG. 16 shows a perspective view of the combination of the flow restricting member of FIGS. 10 to 12 and extraction plate in a reduced outflow position.

FIGS. 10 to 16 show a flow restricting member 27B having a plurality of discrete flow restricting elements 46. Each of the flow restricting elements can be arranged for individually obstructing the flow of one beverage outlet. For example, the flow restricting elements are formed of protruding elements extending from the base plate 28 at the front of the restricting member. The flow restricting elements can be shaped to engage in complementary shaped recessed portions 47 of the extraction plate leading to beverage outlets 22 (FIG. 15). The recessed portions can widen outwardly to facilitate centring of the flow restricting elements. The flow restricting elements can be shaped to obstruct the outlets 22 in a pressure-resistant and liquid-tight manner. Alternatively, the flow restricting elements may partially close the outlets thereby inhibiting the flow therethrough.

The discrete flow restricting elements can be pressure-responsive. For instance, elements 46 can be made of elastically deformable material such as rubber (e.g. silicone, EPDM), TPA or soft polymer. Alternatively, the elements can be resiliently mounted.

Figure 8:
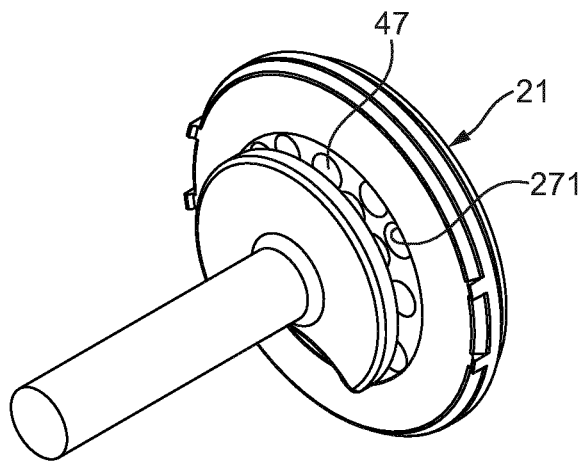
Figure 9:
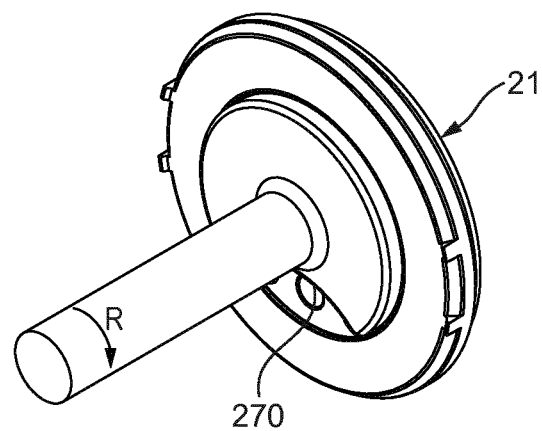
Figure 10:
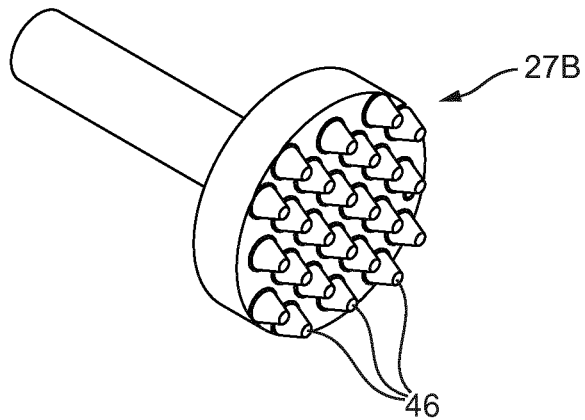
FIGS. 10 to 12 are different views of a second example of a flow restricting member, the member being provided with discrete flow restricting elements.
Figure 11:
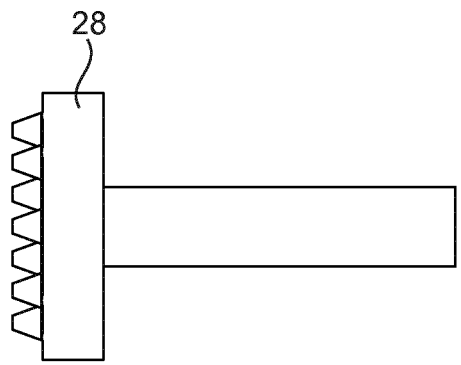
Figure 17:
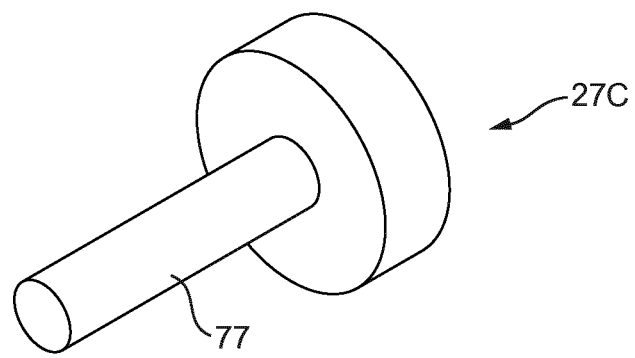
FIGS. 17 to 19 are views of a third example of a flow restricting member with a continuous flow restricting surface.
Figure 18:
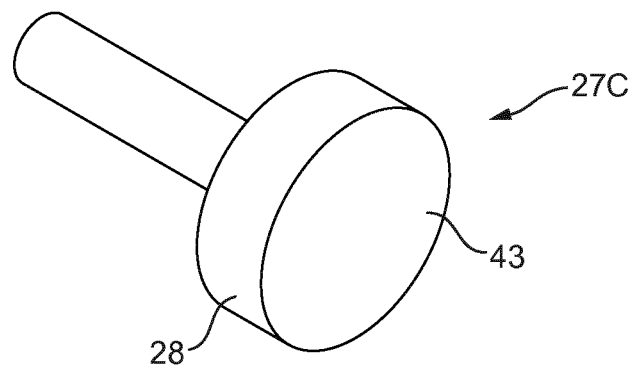
Figure 19:
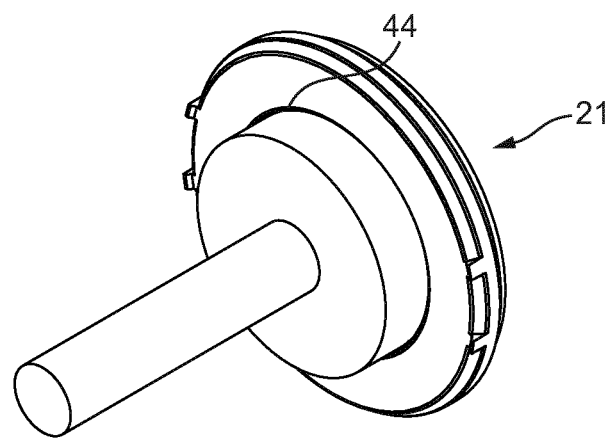

FIGS. 17 and 18 show a flow restricting member 27C with a continuous restricting surface 43. The restricting surface can be dimensioned to cover all the beverage outlets of the extraction plate in the flow reducing position as represented in FIG. 8. The restricting surface may remain at a minimal distance of the beverage outlets, e.g. about 0.05 mm, to ensure a small gap 44 for the beverage flow to pass between extraction plate and the restricting member. The flow surface area resulting from this gap is smaller than the total surface area of the beverage outlets so that a significant back pressure and flow reduction is obtained.

In the mode of FIGS. 17 and 18, the flow restricting member may also be moved to abut against the surface of the extraction plate in a manner to ensure that the flow restriction surface 43 closes all the beverage outlets 22. Such full closing position can be selected such as for operating a pre-wetting of the ingredients in the capsule and be maintained for a few seconds, for example. Then, the flow restricting member can be moved away from the extraction plate to leave all beverage opened and unhindered.

As illustrated in FIG. 20, beverage machine 100 includes extraction unit 1. The beverage machine generally comprises a pump 34 for supplying water to the extraction unit and a control unit 35 configured for controlling a relative movement of the flow restricting member (27,27A,27B, 27C), e.g. via drive member 30, which moves the piercing member between the two or more positions. The beverage machine may also comprise a water tank 36 for supplying the pump 34 with water via a fluidic line 37. The machine may include a thermal conditioner, such as a heater and/or a cooler e.g. a flow heater and/or a flow cooler, for thermally conditioning water supplied by the pump 34 to the extraction unit. The machine may comprise a water flow sensor 76 for measuring the flow rate of water fed to the injection part of the extraction unit. The flow rate measure may be used to measure the volume of fed water during a given beverage serving and stop the pump when the desired volume is reached (a volume required for a ristretto, espresso, lungo or Americano coffee, or a user-defined volume) and/or for controlling the pump action during operation by the control unit (loop control of the pump).

The beverage machine 100 may comprise a mode selector 38 for selecting the pressure and/or flow rate of the extraction unit. The mode selector 38 may, for instance, comprise physical or virtual buttons on a user interface. The mode selector could also be arranged at distance of the coffee machine such as on remote user interface, e.g. a smart phone and the like. The mode selector may include at least one high pressure or reduced outflow extraction mode in which the control unit operates the pump to supply water to the extraction unit while maintaining the flow restricting member in retracted position as in FIG. 5.

The beverage machine may further comprise an electrical motor 39 for automatically actuating the driving assembly 17 of the extraction unit between the open and closed positions of the injection part relative to the extraction part. The motor 39 is generally controlled by the control unit 35 after a selection on the mode selector 38 has been made by the user.

The control unit 35 is arranged for controlling the drive member 30 depending on the extraction mode selected on the mode selector. In the reduced outflow extraction mode, the control unit actuates the drive member 30 to position the flow restricting member in a flow reducing position. The variability on pressure of extraction is advantageously reduced. In standard extraction mode, the control unit actuates the drive member 30 in reverse direction to position the flow restriction member in a free flow position (i.e. standard outflow position) or maintain it into the free flow position, i.e. the flow restricting member being away from the extraction plate. The selection between the two positions may be determined as function of the type of capsule, e.g. coffee blend characteristics, inserted in the extraction unit. Such selection may be automatic such as by recognition (e.g. of colour, barcode, metal, tag, etc.) of the type of capsule.

Of course, machine 100 may be configured for more than two extraction modes by appropriately positioning a suitable flow restricting member.

Control unit 35 can be configured to: maintain flow restricting member 27,27A,27B,27C and extraction plate 21 relatively stationary during an entire extraction of beverage from a capsule 2 in extraction chamber 8; and/or vary the relative positions of the flow restricting member and the extraction plate during an extraction of beverage from a capsule in the extraction chamber (e.g. to provide a prewetting step at the beginning of extraction). The machine can be configured to maintain the flow restricting member and the extraction plate relatively stationary during an entire extraction of beverage from a capsule of a first type and to vary the relative positions of the flow restricting member and the extraction plate during an extraction of beverage from a capsule of a second type.

The invention claimed is:

1. A beverage extraction unit for extracting a beverage from an exchangeable capsule containing a beverage ingredient and comprising a liquid entry wall, the exchangeable capsule further comprising a beverage outlet membrane, the beverage extraction unit comprising:
   a frame;
   an injection part for accommodating the liquid entry wall of the exchangeable capsule and comprising at least a water outlet for injection of water in the exchangeable capsule; and
   an extraction part delimiting with the injection part an extraction chamber in which the exchangeable capsule is housed during extraction, the extraction part and the injection part being relatively movable to open and close the extraction chamber, the exchangeable capsule being insertable into and/or removable from the open extraction chamber and the exchangeable capsule being extractible when housed in the closed extraction chamber,
   the extraction part comprising an extraction plate having a plurality of beverage outlets for allowing the beverage to flow through the extraction plate; and
   the extraction part further comprises a flow restricting member arranged relative to the extraction plate in a moveable manner between a standard outflow position and a reduced outflow position, wherein a flow surface area of the plurality of beverage outlets in the reduced outflow position is reduced compared to a flow surface area of the plurality of beverage outlets in the standard outflow position by obstructing a part of the plurality of beverage outlets, the part of the plurality of beverage outlets obstructed by the flow restricting member being partly or entirely closed, wherein the flow surface area of the plurality of beverage outlets in the reduced outflow position includes at least one unobstructed beverage outlet.

2. The beverage extraction unit of claim 1, wherein the extraction plate comprises a plurality of raised elements configured for providing orifices in the outlet membrane.

3. The beverage extraction unit of claim 1, wherein the extraction part is devoid of any piercing and/or cutting element for piercing and/or cutting the outlet membrane.

4. The beverage extraction unit according to claim 1, wherein the flow restricting member is moveable relatively to the extraction plate between a standard outflow position in which essentially all beverage outlets are left open and at least one reduced outflow position in which the flow restricting member selectively obstructs a part of the beverage outlets.

5. The beverage extraction unit according to claim 4, wherein the flow restricting member is arranged for taking at least two selectable reduced outflow positions in which the flow surface area of the beverage outlets is reduced at different values.

6. The beverage extraction unit according to claim 4, wherein the flow restricting member is arranged to move, between the standard outflow position and the reduced outflow position, translationally or rotationally or translationally and rotationally, relative to the extraction plate.

7. The beverage extraction unit according to claim 4, wherein the flow restricting member may be rotationally movable between:
   a first standard outflow position and a second standard outflow position, the beverage outlets in the first standard outflow position and the second standard outflow position having the same flow surface area, the obstructed beverage outlets in the first standard outflow position being non-identical to the obstructed beverage outlets in the second outflow standard position; and/or
   a first reduced outflow position and a second reduced outflow position, the beverage outlets in the first reduced outflow position and the second reduced outflow position having the same or a different flow surface area, the obstructed beverage outlets in the first reduced outflow position being non-identical to the obstructed beverage outlets in the second reduced outflow position.

8. The beverage extraction unit according to claim 4, wherein the flow restricting member comprises at least one continuous flow restricting surface configured to obstruct more than one beverage outlet in the reduced outflow position.

9. The beverage extraction unit according to claim 4, wherein the flow restricting member comprises a plurality of discrete flow restricting elements, each of the flow restricting elements being arranged for individually obstructing one beverage outlet of the plurality of beverage outlets.

10. The beverage extraction unit according to claim 9, wherein the flow restricting surface or the plurality of discrete flow restricting elements is/are pressure-responsive, optionally the restricting surface or the plurality of discrete flow restricting elements being resiliently mounted.

11. The beverage extraction unit according to claim 10, wherein the plurality of discrete flow restricting elements have variable compressible lengths and/or are resiliently mounted with variable resilience to vary the number of closed outlets as a function of the level of compression of the raised elements against the extraction plate.

12. The beverage extraction unit according to claim 1, which comprises at least one drive member, e.g. a piston, connected to the flow restricting member and extraction plate for relatively moving the flow restricting and extraction plate so as to reduce or increase the flow surface area of the extraction plate.

13. A beverage machine comprising:
a beverage extraction unit for extracting a beverage from an exchangeable capsule containing a beverage ingredient and comprising a liquid entry wall, the exchangeable capsule further comprising a beverage outlet membrane, the beverage extraction unit comprising:
a frame,
an injection part for accommodating the liquid entry wall of the exchangeable capsule and comprising at least a water outlet for injection of water in the exchangeable capsule, and
an extraction part delimiting with the injection part an extraction chamber in which the exchangeable capsule is housed during extraction, the extraction part and the injection part being relatively movable to open and close the extraction chamber, the exchangeable capsule being insertable into and/or removable from the open extraction chamber and the exchangeable capsule being extractible when housed in the closed extraction chamber,
the extraction part comprising an extraction plate having a plurality of beverage outlets for allowing the beverage to flow through the extraction plate, and
the extraction part further comprises a flow restricting member arranged relative to the extraction plate in a moveable manner between a standard outflow position and a reduced outflow position in which a flow surface area of the plurality of beverage outlets is reduced compared to a flow surface area of the plurality of beverage outlets in the standard outflow position by obstructing a part of the plurality of beverage outlets, the part of the plurality of beverage outlets obstructed by the flow restricting member being partly or entirely closed, wherein the flow surface area of the plurality of beverage outlets in the reduced outflow position includes at least one unobstructed beverage outlet;
a pump for supplying water to the beverage extraction unit; and
a control unit configured for controlling a relative movement of the flow restricting member, between the standard outflow position and the reduced outflow position.

14. The beverage machine of claim 13, wherein the control unit is configured to:
maintain the flow restricting member and the extraction plate relatively stationary during an entire extraction of beverage from the exchangeable capsule in the extraction chamber; and/or
vary the relative positions of the flow restricting member and the extraction plate during an extraction of beverage from the exchangeable capsule in the extraction chamber.

\* \* \* \* \*